United States Patent
Wildermuth et al.

(10) Patent No.: US 7,712,788 B2
(45) Date of Patent: May 11, 2010

(54) CONNECTING ARRANGEMENT FOR REFRIGERANT LINES

(75) Inventors: Andreas Wildermuth, Marbach (DE); Alex Werner, Backnang (DE); Mike Eismann, Oberriexingen (DE); Wolfgang Plischke, Schwäbisch Gmünd (DE); Klaus Lesser, Burgstetten (DE)

(73) Assignee: ContiTech Kuehner GmbH & Cie. KG, Oppenweiler (DE)

( * ) Notice: Subject to any disclaimer, the term of this patent is extended or adjusted under 35 U.S.C. 154(b) by 0 days.

(21) Appl. No.: 11/913,087

(22) PCT Filed: Mar. 10, 2006

(86) PCT No.: PCT/EP2006/002203

§ 371 (c)(1),
(2), (4) Date: Oct. 30, 2007

(87) PCT Pub. No.: WO2006/117039

PCT Pub. Date: Nov. 9, 2006

(65) Prior Publication Data

US 2008/0197629 A1     Aug. 21, 2008

(30) Foreign Application Priority Data

Apr. 30, 2005   (DE) .................. 10 2005 020 259

(51) Int. Cl.
*F16L 3/08*   (2006.01)
*F16L 5/00*   (2006.01)
*F16L 41/00*  (2006.01)

(52) U.S. Cl. ................. 285/142.1; 285/137.11; 285/205; 285/208; 285/379

(58) Field of Classification Search .......... 285/136.1, 285/137.11, 139.1, 139.2, 139.3, 142.1, 205, 285/379, 206, 207, 208
See application file for complete search history.

(56) References Cited

U.S. PATENT DOCUMENTS 3,336,055 A * 8/1967 Pall et al. ............... 285/87
4,225,161 A * 9/1980 Smith ................. 285/137.11

(Continued)

FOREIGN PATENT DOCUMENTS

DE             4203334 A1 *  8/1993

(Continued)

*Primary Examiner*—James M Hewitt
(74) *Attorney, Agent, or Firm*—Laurence A. Greenberg; Werner H. Stemer; Ralph E. Locher

(57) ABSTRACT

A connecting assembly for coolant lines, in particular for motor vehicle air conditioning systems which are operated with $CO_2$, from a first coupling element that can be connected to a first line end piece, and a further air conditioning circuit component. The first coupling element and the air conditioning circuit component are joined by a screw so that the first line end piece and the air conditioning circuit component are connected to one another by means of one bore each and radially extending sealing faces. A sealing ring is arranged between the faces. A space holder is arranged between the first coupling element and the further air conditioning circuit component. The first line end piece has a radially extending sealing face which is produced by plastic deformation of the line end piece without removing material. The first coupling element has an annular collar which presses the sealing face onto the sealing ring in the mounted state.

8 Claims, 3 Drawing Sheets

U.S. PATENT DOCUMENTS

| | | | |
|---|---|---|---|
| 5,174,612 A * | 12/1992 | Schnell | 285/49 |
| 5,516,157 A * | 5/1996 | Williamson | 285/212 |
| 5,727,304 A * | 3/1998 | Eybergen | 29/525.04 |
| 5,918,912 A * | 7/1999 | Keifel et al. | 285/124.1 |
| 6,095,777 A * | 8/2000 | Nishihata et al. | 418/55.1 |
| 6,193,283 B1 * | 2/2001 | Pickett et al. | 285/137.11 |
| 6,328,351 B1 * | 12/2001 | Kato et al. | 285/368 |
| 6,386,593 B1 * | 5/2002 | Slais et al. | 285/205 |
| 6,893,052 B2 * | 5/2005 | Wildermuth et al. | 285/205 |
| 6,908,117 B1 * | 6/2005 | Pickett et al. | 285/137.11 |
| 6,969,094 B2 * | 11/2005 | Frohling et al. | 285/205 |
| 2002/0070543 A1 * | 6/2002 | Aaron, III | 285/23 |
| 2003/0080554 A1 * | 5/2003 | Schroeder et al. | 285/125.1 |
| 2004/0080159 A1 * | 4/2004 | Schroeder et al. | 285/205 |
| 2004/0155456 A1 * | 8/2004 | Wildermuth et al. | 285/18 |
| 2005/0023828 A1 * | 2/2005 | Takeuchi et al. | 285/205 |

FOREIGN PATENT DOCUMENTS

| | | | |
|---|---|---|---|
| EP | 1 445 529 | * | 8/2004 |
| WO | WO 2004113780 A1 | * | 12/2004 |

* cited by examiner

CONNECTING ARRANGEMENT FOR REFRIGERANT LINES

BACKGROUND OF THE INVENTION

Field of the Invention

The invention relates to a connecting arrangement for mobile refrigeration systems for connecting refrigerant lines to further air-conditioning circuit components, in particular for the refrigerant $CO_2$, composed of a first coupling piece which can be moveably connected to a first line end piece and a further air-conditioning circuit component, with the first coupling piece and the further air-conditioning circuit component being joined together by fastening means in such a way that the first line end piece and the further air-conditioning circuit component are connected to one another by means of in each case one bore and radially running sealing surfaces, with a sealing ring being arranged between the sealing surfaces, and with a single screw, which is arranged laterally offset from the sealing surfaces, being provided as a fastening means, and that, spaced apart from the screw on that side which faces away from the sealing surfaces, a non-compressible molding is arranged as a spacer between the coupling pieces.

EP 1 445 529 A1 discloses a connecting arrangement for refrigerant lines of the specified type. The line end pieces are fixedly connected to the respective coupling pieces in a cohesively joined manner, for example by means of soldering. Here, the sealing surfaces are formed by the coupling pieces and are generated in a cutting process.

As a result of the heat input during soldering, heat distortion is generated in the coupling pieces, which heat distortion leads to changes to the sealing surfaces in terms of shape and position. The dimensional fluctuations of the resulting gap between the connected coupling pieces are very large as a result, and must be compensated by means of the flat seal which is used in order to generate the required impermeability. The reliability of the process of this approach is problematic.

SUMMARY OF THE INVENTION

The invention is therefore based on the object of improving the described connecting arrangement in such a way that heat distortion of the components no longer occurs.

Said object is achieved in that the first line end piece is guided through the bore of the first coupling piece and has, at its end which faces toward the further air-conditioning circuit component and projects out of the first coupling piece, a radially extending sealing surface which is generated by means of plastic deformation of the first line end piece in a non-cutting process, in that the first line end piece has, in the region of the bore of the first coupling piece, a widened portion, in such a way that the first coupling piece is fixed in a rotationally secured and immovable manner to the first line end piece, and in that the first coupling piece has, on that end of the bore which faces toward the further air-conditioning circuit component, an annular collar which points toward the further air-conditioning circuit component, wherein the annular collar is assigned to the rear side, which faces away from the further air-conditioning circuit component, of the radial sealing surface of the first line end piece, and, in the fully-assembled state in which it presses against said rear side, presses the radial sealing surface of the first line end piece onto the sealing ring.

Said arrangement permits a form-fitting and frictionally engaging connection of the first coupling piece to the first line end piece without a damaging heat input. Soldering or other thermal connecting methods are not required. The gap dimension tolerance between the radial sealing surface of the first line end piece and the further air-conditioning circuit component is smaller, so that the sealing ring must compensate fewer non-uniformities. In addition, the strength properties of the components are not adversely affected by means of a heat input.

One advantageous embodiment of the invention provides that the sealing ring is a metallic flat ring with a circumferential bead. A flat ring of said type can advantageously be compressed when the connecting arrangement according to the invention is screwed together, and said flat ring is particularly impermeable and resistant to subcritical or supercritical $CO_2$ as a result. A metallic flat ring of said type is particularly impermeable and resistant to the refrigerant R 744 and so-called PAG oils. In conventional connecting arrangements, the use of metallic flat rings as sealing rings was not directly possible. In particular, a great deal of force must be applied to compress flat rings in order to obtain absolute sealing. In the connecting arrangement according to the invention, such compression is however facilitated since at least one of the sealing surfaces is composed of the material of the line end piece, which is conventionally softer than the material of the coupling piece. Said softer material offers a high potential for adaptation to a metallic sealing ring as a result of the possibility of relatively easy plastic deformability.

One refinement of the invention provides that the sealing ring is inserted in a shallow plastic cap which is arranged between the sealing surfaces, with the plastic cap and the first coupling piece and the first line end piece with its radial sealing surface being formed such that the plastic cap can be fastened between the sealing surfaces in a simple manner, in particular clipped on the edge of the radial sealing surface of the first line end piece, before the first coupling piece is screwed to the further air-conditioning circuit component.

A plastic cap of said type serves to captively hold the sealing ring, since the sealing ring is not fixed until the coupling pieces are screwed together. The plastic cap additionally serves to center the sealing ring on the sealing surface.

Corresponding to one refinement of the invention, the further air-conditioning circuit component is constructed from a second coupling piece and a second line end piece, with the second line end piece being guided through a bore of the second coupling piece and having, at its end which faces toward the first coupling piece and projects out of the second coupling piece, a radially extending sealing surface which is generated by means of plastic deformation of the second line end piece in a non-cutting process, that the second line end piece has, in the region of the bore of the second coupling piece, a widened portion, in such a way that the second coupling piece is fixed in a rotationally secured and immovable manner to the second line end piece, and that the second coupling piece has, on that end of the bore which faces toward the first coupling piece, an annular collar which points toward the first coupling piece, wherein the annular collar is assigned to the rear side, which faces away from the first coupling piece, of the radial sealing surface of the second line end piece, and, in the fully-assembled state in which it presses against said rear side, presses the radial sealing surface of the second line end piece onto the sealing ring.

According to one refinement of the invention, the line end pieces are aligned flush with one another.

The invention is explained below on the basis of exemplary embodiments which are illustrated in the drawing, in which:

DESCRIPTION OF THE INVENTION

Figure 1:
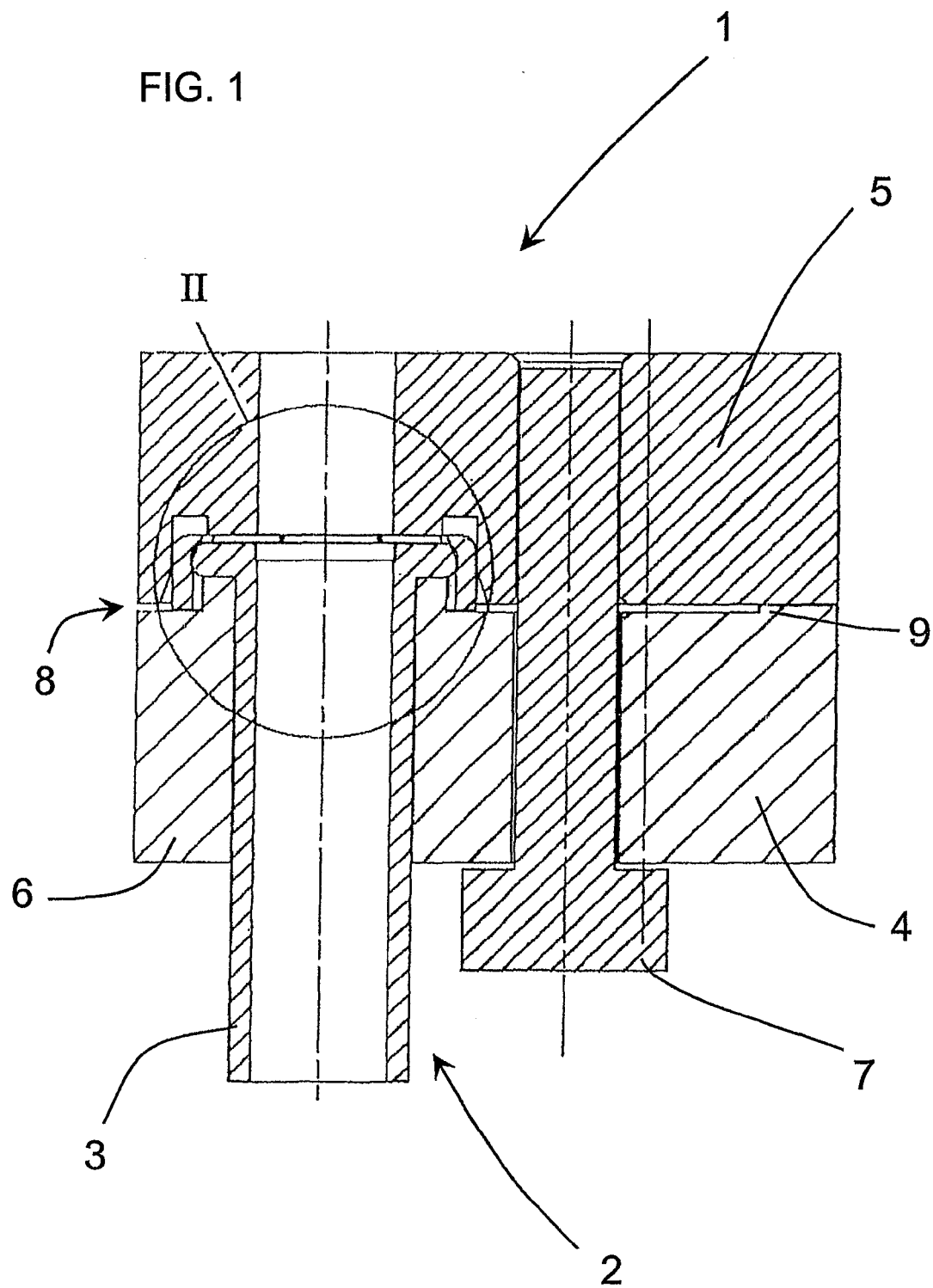
FIG. 1 is a schematic cross-sectional illustration of the connecting arrangement according to the invention, in a plan view.

The connecting arrangement 1 illustrated in FIG. 1 for refrigerant lines 2 is composed of a first coupling piece 4, which is sealingly connected to a first line end piece 3, and a further air-conditioning circuit component 5. The first coupling piece 4 has a bore 6 through which the line end piece 3 is guided. The first line end piece 3 is widened in the region of the bore 6 by a dimension which is not visible here, so that a press connection is generated between the first line end piece 3 and the first coupling piece 4. The coupling piece 4 and the further air-conditioning circuit component 5 are clamped together by means of a screw 7.

Arranged between the coupling piece 4 and the further air-conditioning circuit component 5, which are spaced apart from one another by a gap 8, is a non-compressible spacer 9, at a predetermined distance from the screw 7 and on the opposite side of the screw 7 from the bore 6.

Figure 2:
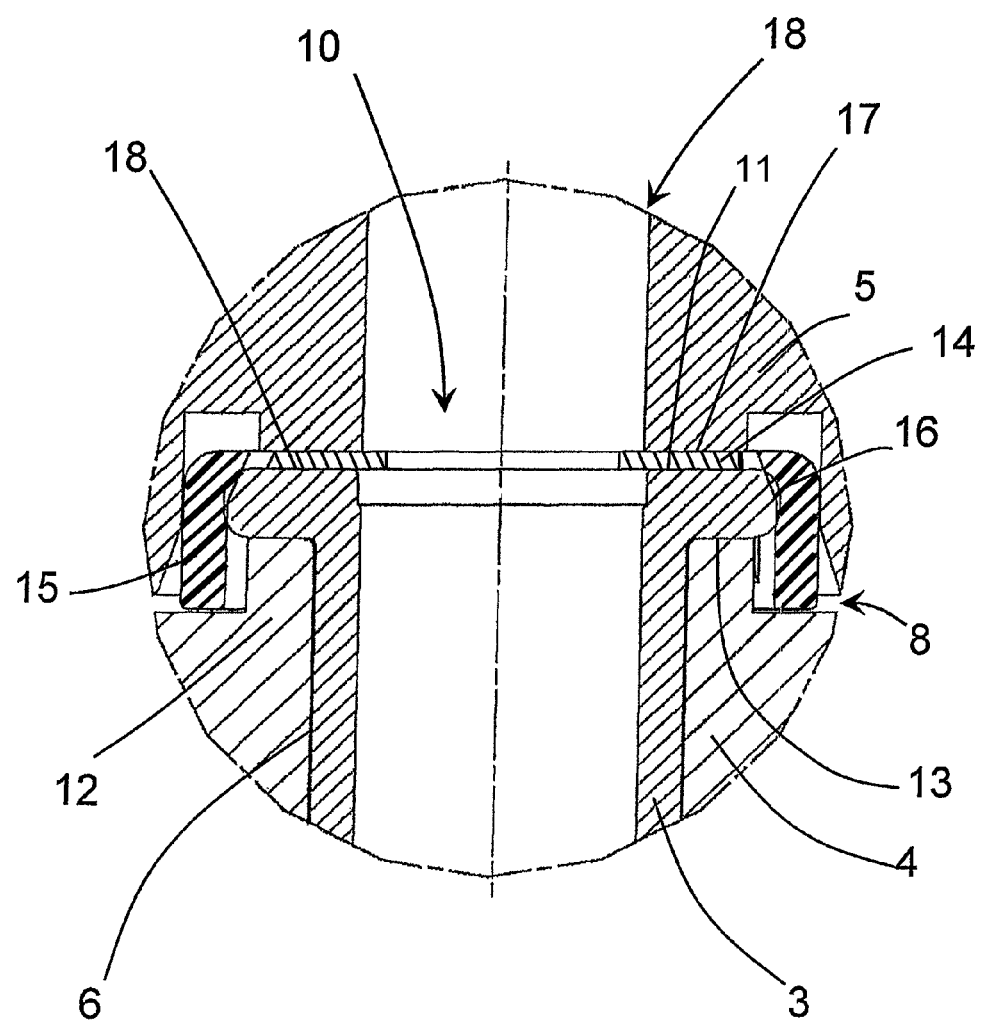
FIG. 2 shows an enlarged detail of FIG. 1.

FIG. 2 illustrates an enlarged detail from FIG. 1. The first line end piece 3 has, at its end 10 which faces toward the further air-conditioning circuit component and projects out of the first coupling piece 4, a radially extending sealing surface 11 which is generated by means of plastic deformation of the first line end piece 3 in a non-cutting process, and which, as a result of the non-cutting deformation, has a greater diameter than the rest of the first line end piece.

The first coupling piece 4 has, on that end of the bore 6 which faces toward the further air-conditioning circuit component 5, an annular collar 12 which points toward the further air-conditioning circuit component 5, wherein the annular collar 12 is assigned to the rear side 13, which faces away from the further air-conditioning circuit component 5, of the radial sealing surface 11 of the first line end piece 3, and, in the fully-assembled state in which it presses against said rear side 13, presses the radial sealing surface 11 of the first line end piece 3 onto a sealing ring 14.

The sealing ring 14 is held by a plastic cap 15 which is clipped over the edge 16 of the radial sealing surface 11 of the first line end piece 3.

If the screw 7 is tightened, the sealing ring 14 is pressed by the first coupling piece 4, via the annular collar 12, against the further air-conditioning circuit component 5, with the further air-conditioning circuit component 5 itself having a sealing surface 17 which is generated in a cutting process.

Here, the spacer 9 ensures that the sealing surface 11 of the first line end piece and the sealing surface 17 of the further air-conditioning circuit component 5 are aligned approximately parallel to one another, and the force distribution on the sealing ring 14 is as uniform as possible.

The first coupling piece 4 and the further air-conditioning circuit component 5 are arranged with respect to one another in such a way that the first line end piece 3 is aligned with a bore 18 in the further air-conditioning circuit component 5.

Figure 3:
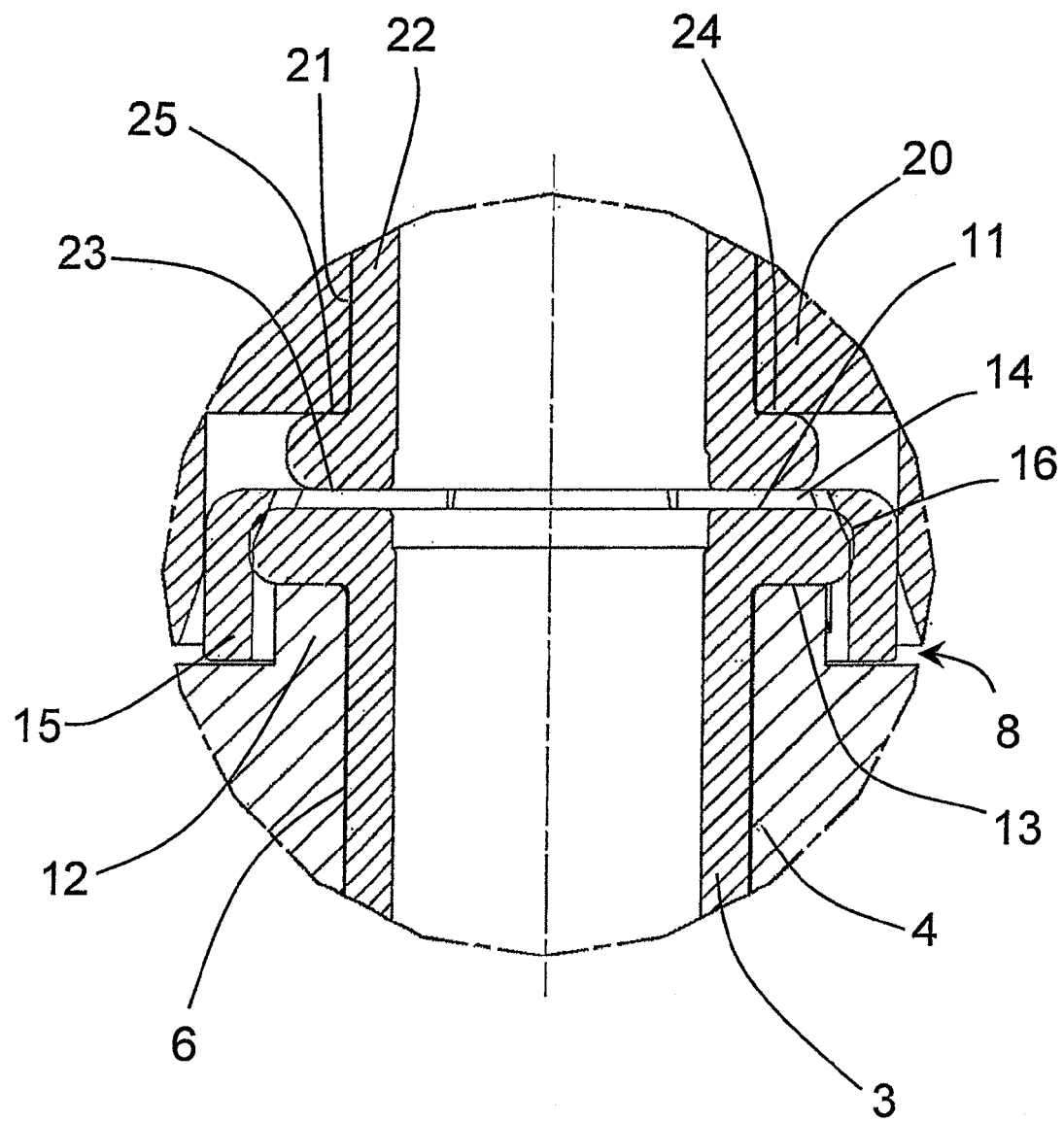
FIG. 3 shows an enlarged detail of the connecting arrangement according to the invention having two line end sections.

FIG. 3 shows an enlarged detail of the connecting arrangement 1 in which the further air-conditioning circuit component 5 is formed by a second coupling piece 20 with a second line end piece 21. The second coupling piece 20 has a bore 21 through which a second line end piece 22 is guided, with the connection between the second line end piece 21 and the second coupling piece 20 being formed as a press connection, as in FIG. 1. The second line end piece 22 has, at its end which faces toward the first line end piece and projects out of the second coupling piece 20, a radially extending sealing surface 23 which is generated by means of plastic deformation of the second line end piece 22 in a non-cutting process, the diameter of which sealing surface 23 is greater than the rest of the second line end piece 22.

The second coupling piece 20 has, on that end of the bore 21 which faces toward the first line end piece 3, an annular collar 24 which points toward the first line end piece 22, wherein the annular collar 24 is assigned to the rear side 25, which faces away from the first line end piece 3, of the radial sealing surface 23 of the second line end piece 22, and, in the fully-assembled state in which said annular collar presses against said rear side 25, presses the radial sealing surface 23 of the second line end piece 22 onto the sealing ring 14.

If the screw 7 is tightened, the sealing ring 14 is pressed by the second coupling piece 20, via the annular collar 24, against the sealing surface 11 of the first line end piece 3.

Here, the spacer 9 ensures that the sealing surface 11 of the first line end piece and the sealing surface 23 of the second line end piece 22 are aligned approximately parallel to one another, and the force distribution on the sealing ring 14 is as uniform as possible.

The first coupling piece 4 and the second coupling piece 20 are arranged with respect to one another in such a way that the first line end piece 3 is aligned with the second line end piece 22.

LIST OF REFERENCE SYMBOLS (Part of the Description)
1 Connecting arrangement
2 Refrigerant line
3 First line end piece
4 First coupling piece
5 Further air-conditioning circuit component
6 Bore in the first coupling piece 4
7 Screw
8 Gap
9 Spacer
10 End of the first line end piece 3
11 Sealing surface of the first line end piece 3
12 Annular collar of the first coupling piece 4
13 Rear side of the sealing surface 11
14 Sealing ring
15 Plastic cap
16 Edge of the sealing surface 11
17 Sealing surface of the further air-conditioning circuit component 5
18 Bore in the air-conditioning circuit component 5
20 Second coupling piece
21 Bore in the second coupling piece 20
22 Second line end piece
23 Sealing surface of the second line end piece 24 Annular collar of the second coupling piece
25 Rear side of the sealing surface 23

The invention claimed is:

1. A connecting assembly for mobile refrigeration systems for connecting refrigerant lines each having a respective line end piece with a radial sealing surface being a flange to a further air-conditioning circuit component having a radial sealing surface, comprising:
 a first coupling piece having a bore formed therein and being moveably connectible to a first line end piece and the further air-conditioning circuit component;
 a sealing ring for being disposed between the radial sealing surfaces of the first line end piece and the further air-conditioning circuit component;
 a single screw for joining said first coupling piece and the further air-conditioning circuit component together such that the first line end piece and the further air-conditioning circuit component are connected to one another to have an aligned bore and by the radial sealing surfaces via said sealing ring;
 said single screw being disposed laterally offset from said bore in said first coupling piece;
 a non-compressible molding spaced apart from said single screw and for defining a spacer between said first coupling piece and the further air-conditioning circuit component;
 the first line end piece being disposed within said bore of said first coupling piece, the radial sealing surface of the first line end piece projecting from said first coupling piece and for facing toward the further air-conditioning circuit component;
 the first line end piece having a widened portion in a region of said bore of said first coupling piece, for fixing said first coupling piece in a rotationally secured and immovable manner with respect to the first line end piece;
 said first coupling piece having an annular collar for pointing toward the further air-conditioning circuit component on an end of said bore of said first coupling piece facing toward the further air-conditioning circuit component;
 said annular collar being assigned to a rear side opposite the radial sealing surface of the first line end piece and facing away from the further air-conditioning circuit component;
 in a fully-assembled state of the assembly, said annular collar presses against the rear side, and presses the radial sealing surface of the first line end piece onto said sealing ring.

2. The connecting assembly according to claim 1, configured for conducting $CO_2$ refrigerant.

3. The connecting assembly according to claim 1, wherein said sealing ring is a metallic flat ring with a circumferential bead.

4. The connecting assembly according to claim 1, wherein said sealing ring is disposed in a shallow plastic cap arranged between the radial sealing surfaces of the first line end piece and the further air-conditioning circuit component, and wherein said plastic cap and said first coupling piece and the first line end piece with the radial sealing surface therein are formed such that said plastic cap can be fastened between the radial sealing surfaces of the first line end piece and the further air-conditioning circuit component before said first coupling piece is screwed to the further air-conditioning circuit component.

5. The connecting assembly according to claim 4, wherein said plastic cap can be fastened by clipping on an edge of the radial sealing surface of the first line end piece.

6. The connecting assembly according to claim 1, wherein:
 the further air-conditioning circuit component includes a second coupling piece and a second line end piece;
 the second line end piece is disposed within a bore of the second coupling piece and has at an end thereof facing said first coupling piece and projecting from the second coupling piece, a radially extending sealing surface formed by plastic deformation of the second line end piece in a non-cutting process;
 the second line end piece, in a region of the bore of the second coupling piece, has a widened portion, for fixing the second coupling piece in a rotationally secured and immovable manner with respect to the second line end piece; and
 the second coupling piece having an annular collar pointing toward said first coupling piece on an end of said bore of the second coupling piece facing toward said first coupling piece;
 wherein the annular collar is assigned to a rear side of opposite the radial sealing surface of the second line end piece and facing away from said first coupling piece;
 in the fully-assembled state of the assembly, the annular collar of the second coupling piece presses against the rear side of the second line end piece, and presses the radial sealing surface of the second line end piece onto said sealing ring.

7. The connecting assembly according to claim 6, wherein the first and second line end pieces are aligned with one another.

8. A connecting assembly for mobile refrigeration systems for connecting a refrigerant line having a flange with a radial sealing surface to a further air-conditioning circuit component having a radial sealing surface, comprising:
 a first coupling piece having a bore formed therein configured for receiving the refrigerant line and holding the refrigerant line in an immovable manner, said first coupling piece having an annular collar at said bore and facing toward the further air-conditioning circuit component;
 a sealing ring configured for being disposed between the radial sealing surface of the flange and the radial sealing surface of the further air-conditioning circuit component;
 a screw disposed laterally offset from said bore for joining said first coupling piece to the further air-conditioning circuit component such that the line and the further air-conditioning circuit component are connected to one another for defining a passage;
 a non-compressible molding spaced apart from said screw and for defining a spacer between said first coupling piece and the further air-conditioning circuit component;
 said collar configured for engaging a backside of the flange and supporting flange such that the radial sealing surface of the flange projects beyond said first coupling piece, and in a fully-assembled state said annular collar pressing against the backside of the flange for compressing said sealing ring between the radial sealing surface of the flange and the radial sealing surface of the further air-conditioning circuit component.

* * * * *